(12) United States Patent
Reilly

(10) Patent No.: US 10,951,326 B1
(45) Date of Patent: Mar. 16, 2021

(54) METHOD AND DEVICE FOR SETTING UP LONG RANGE QUANTUM COMMUNICATIONS NETWORKS

(71) Applicant: Turing Inc., Los Angeles, CA (US)

(72) Inventor: Michele Reilly, Los Angeles, CA (US)

(73) Assignee: Turing Inc., Los Angeles, CA (US)

( * ) Notice: Subject to any disclaimer, the term of this patent is extended or adjusted under 35 U.S.C. 154(b) by 0 days.

(21) Appl. No.: 16/549,781

(22) Filed: Aug. 23, 2019

(30) Foreign Application Priority Data

Aug. 22, 2019 (EP) ..................... 19193062

(51) Int. Cl.
*H04B 10/90* (2013.01)
*G06N 10/00* (2019.01)

(52) U.S. Cl.
CPC ............ *H04B 10/90* (2013.01); *G06N 10/00* (2019.01)

(58) Field of Classification Search
CPC ......... G06N 10/00; H04B 10/70; H04B 10/90
See application file for complete search history.

(56) References Cited

U.S. PATENT DOCUMENTS

| 10,255,555 | B2 | 4/2019 | Curtis et al. | |
|---|---|---|---|---|
| 10,352,992 | B1 | 7/2019 | Zeng et al. | |
| 2005/0262179 | A1* | 11/2005 | Tucci | G06N 10/00 708/446 |
| 2008/0258049 | A1* | 10/2008 | Kuzmich | B82Y 10/00 250/214.1 |
| 2011/0133770 | A1 | 6/2011 | Przybysz et al. | |
| 2012/0148237 | A1* | 6/2012 | Harrison | B82Y 10/00 398/37 |
| 2016/0344414 | A1 | 11/2016 | Naaman et al. | |
| 2018/0285761 | A1 | 10/2018 | Gambetta et al. | |
| 2019/0044542 | A1 | 2/2019 | Hogaboam et al. | |
| 2019/0065299 | A1 | 2/2019 | Lee et al. | |
| 2019/0325336 | A1 | 10/2019 | Reilly | |
| 2019/0325537 | A1 | 10/2019 | Reilly | |

(Continued)

OTHER PUBLICATIONS

Devitt et al. In "High-speed quantum networking by ship," Scientific Reports 6:36163 (DOI: 10.1038/srep36163), p. 1-7 (Year: 2016).*

(Continued)

*Primary Examiner* — Devan A Sandiford
(74) *Attorney, Agent, or Firm* — Proskauer Rose LLP

(57) ABSTRACT

Described is a method of setting up a plurality of quantum communications links, forming a quantum network providing provably secure communications and internet services over intercontinental distances without requiring direct line of sight communication or the intermediate use of the entanglement resource of satellites. Also described is a quantum communicator device for use in this method. Two or more quantum memory units are disposed at a first location, an entangled link is set up between at least two of the quantum memory units, at least one of the quantum memory units sharing in the entangled link is physically transported to a second location. The quantum communicator device comprises communications nodes, an optical interface to set up entanglement to other devices and storage nodes, each node in the form of a quantum memory unit capable of storing quantum information for a desired length of time, i.e. weeks or longer.

10 Claims, 5 Drawing Sheets

(56) References Cited

U.S. PATENT DOCUMENTS

2020/0242208 A1   7/2020   Daraeizadeh et al.

OTHER PUBLICATIONS

Herr, Daniel et al., "Time versus Hardware: Reducing Qubit Counts with a (Surface Code) Data Bus," arXiv:1902.08117, Feb. 21, 2019, available at https://arxiv.org/abs/1902.08117, 23 pages.
Devitt, Simon J. et al., "Quantum Error Correction for Beginners," arXiv:0905.2794v4, Jun. 21, 2013, available at https://arxiv.org/abs/0905.2794, 41 pages.
Shafaei, Alireza et al., "Optimization of Quantum Circuits for Interaction Distance in Linear Nearest Neighbor Architectures," DAC '13, May 29-Jun. 7, 2013, Austin, TX, available at http://www.mpedram.com/Papers/LNNSyn-dac13.pdf, 6 pages.
Fowler, Austin G. et al., "Quantum Error Correction on Linear Nearest Neighbor Qubit Arrays," arXiv:quant-ph/0311116v1, Nov. 18, 2003, available at https://arxiv.org/abs/quant-ph/0311116, 5 pages.
Corcoles, A.D. et al., "Demonstration of a quantum error detection code using a square lattice of four super conducting qubits," Nature Communications 6, Article No. 6979 (2015), 10 pages.
Varsamopolous, Savvas et al., "Comparing Neural Network Based Decoders for the Surface Code," arXiv:1811.12456v3, Nov. 26, 2019, available at https://arxiv.org/abs/1811.12456, 12 pages.

* cited by examiner

METHOD AND DEVICE FOR SETTING UP LONG RANGE QUANTUM COMMUNICATIONS NETWORKS

TECHNICAL FIELD

The present disclosure relates to methods and devices for establishing long range quantum communications networks. In particular, it relates to methods of setting up a plurality of quantum communications links, together forming a quantum communications network, over intercontinental distances without requiring direct line of sight communication and devices for use in these methods.

BACKGROUND

Technology for the manipulation of quantum information has recently moved from the domain of pure fundamental research to applications. An important component in the quantum technology ecosystem are quantum communications networks, i.e. networks that allow the transmission of quantum information between physically separated nodes. This ability is useful in at least two ways: it will frequently be desirable to transmit quantum information that is the input to or the result of a computation of a quantum computer or quantum simulator to another computer or simulator for (further) processing. Since universal quantum computers and even the simpler to realize simulators are still in their infancy, this application is not yet the main application of quantum communication.

A second use that is of more immediate interest is the employing quantum communications networks to generate key material between two parties wishing to exchange secret information. There are various protocols that have been proposed for this application. They generally work by setting up entangled links between the parties that are then used to first generate a raw key, from which a secret key is then extracted by a process termed distillation. If an eavesdropper is trying to obtain all or part of that key material, his/her presence will be revealed by (a lack of) correlation between the material generated that can be ascertained by detecting violations of certain inequalities of the correlators computed from the measured data.

This secret key is then used as a one-time-pad by the parties to encrypt classical communications channels. Since one-time-pad encryption is proven to be secure, and the key generation via the quantum channels is provably secure as well, one has a provably secure method of communication. This is very desirable for highly sensitive communications both for government and the private sector.

There are currently two technologies that are being pursued in research as well as practical applications to establish the entangled links required for quantum communications: fiber optical networks and satellites. The first utilize the high-purity optical fibre technology developed and being used for broad-band classical communications.

However, due to the degradation on the order of about 125 dB/km that is still experienced by signals sent through these fibres, they by themselves do not allow high fidelity communications over more than a few hundred metres. Fibre optical quantum networks are therefore dependent on a class of techniques/devices called quantum repeaters to boost the distances over which high fidelity links can be established. Even using such quantum repeaters, the distances that can be covered are, however, still limited to a few tens of kilometers, which is sufficient only for citywide or regional quantum communication at best.

Satellites employ free-space line-of-sight communication to transmit entangled photons. Usually there is a source of entangled photons on the satellite and each photon of an entangled pair is transmitted directly to a ground station comprising quantum memory units equipped with optical interfaces. By receiving the photon and storing its state in the quantum memory, an entangled link can be set up to the ground station receiving the other photon of the pair.

Due to the much lower attenuation of free-space compared to optical fibres, much longer distances can thus be covered. In recent experiments, quantum key distribution experiments have demonstrated entanglement distribution over distances up to 1,200 km.

While this compares favourably to fibre optics, it is still insufficient for secure intercontinental communications. Extending the quantum communication distances much beyond the presently possible is, however, difficult due to the fact that, when using a single satellite, atmospheric losses become greater as the angle at which the beam from the satellite directed at the ground stations becomes shallower with greater distance.

This could be mitigated by using two or more satellites to bounce off the one or both of the photons of an entangled pair, yet this comes with its own difficulties of firstly requiring a large number of satellites and secondly involving absorption and retransmission of photons which reduces fidelity, in particular at the, usually, high relative speeds of the satellites. Also, line-of-sight communications comes with the disadvantage that communication may be hampered or impeded by an adversary simply cutting the direct line of sight at any point, e.g. close to the receiving ground stations or, alternatively close to the transmitting satellite.

Devitt et al. in "High-speed quantum networking by ship," Scientific Reports 6:36163 (DOI: 10.1038/srep36163) (incorporated herein by reference) recently proposed to create long range entanglement between two locations not by sending entangled photons, transferring their entanglement to quantum memories after absorption, but by physically moving the quantum memories themselves. However, in part due to the nature of the quantum memories proposed therein, their operational procedures for such quantum communications are restricted to two-point connections, which is sufficient only in a small number of practical applications.

SUMMARY

It is therefore an object of the present invention to find alternative ways of setting up long range quantum communications links which do not suffer from the drawbacks of the above-described state of the art approaches.

It is moreover an object of this invention to extend the known methods of setting up quantum connections between locations to more practically useful forms and larger quantum communications networks.

An object of the invention is, in particular, to find network structures and methods of establishing them which are optimized in regard of one or more of the criteria simplicity, efficiency and economy.

In a first aspect of the invention, this object is achieved by a method of setting up long range communications links as set out in claims 1-9. The method involves providing two or more quantum memory units disposed at a first location and then setting up an entangled link between two or more of the quantum memory units.

This may be done by methods known in the art, such as transmitting and absorbing entangled pairs of photons to each of the memory units. The quantum memory units are then physically moved to desired target locations. This may involve moving only one quantum memory unit of a pair of quantum memory units sharing an entangled link to a second location, or it may involve moving both units of the pair to locations other than the first location.

At the target locations the entanglement between the quantum memory units may then be used to achieve a desired information processing task, such as generating (part of) secret key material shared by users at these target locations or to teleport a quantum state stored in a further quantum memory, which can be part of a larger quantum information processing hardware such as a quantum simulator or specific or general purpose quantum computer, located at one of the target locations to another of the target locations.

Rather than only creating a link between two memory units or several separate pairs of memory units at two locations, the invention proposes to establish more elaborate entanglement networks spanning multiple locations. An entangled link joining a pair of quantum memory units, or rather the (logical) qubits of these quantum memory units that are holding the link, corresponds to a very simple graph state consisting of two nodes joined by an edge.

In some embodiments of the method, more than two quantum memories are joined into networks corresponding to more complex graphs. For instance, a network corresponding to a graph with three nodes and two edges, where one central node is connected to each of the other two nodes by one edge may be set up by setting up a first entangled link from the central node to one of the two other nodes and a second entangled link from the central node to the other of the two other nodes. These links may be set up sequentially or in parallel.

In the central node, the two links may at first be stored in separate logical qubits with one of the links transferred from one to the other logical qubit via a two-qubit operation. This would allow to set up the links simultaneously, which may, depending on the speed of the two qubit operation, be faster than a sequential set up of links.

On the other hand, a sequential set-up is necessary if, as in other embodiments, the second link is from the outset held by/stored in the same logical qubit of the quantum memory unit corresponding to the central node as the first link. The skilled person will appreciate, that by repeated application of these operations, quantum networks corresponding to arbitrary graphs may be set up.

In general, according to the invention, there may be more than two quantum memory units provided at the first location and/or there may be more than only one location where quantum memory units are provided and entangled according to the first two steps of the method of the invention.

In important embodiments of the invention, a number of entangled quantum memory units are prepared at a root location, wherein the memory units are classified as stationary and mobile memory units. Each stationary quantum memory unit is entangled with one or more mobile quantum memory units, while each mobile quantum memory unit is entangled with exactly one associated stationary memory unit, as well as the other mobile quantum memory units that stationary unit may be entangled with. The number of stationary quantum memory units is at least as great as a number of locations of a first tier in a hierarchy of locations with each stationary quantum memory unit of the root node being assigned to exactly one of these first tier locations.

Following the entanglement of the root node quantum memory units, all mobile quantum memory units are then transported to the first tier location assigned to their associated stationary root node quantum memory unit.

In steps that may be performed before, during or after the preparation and physical movement of the root node quantum memory units, at each first tier location there is similarly provided a set of quantum memory units which can be classified into the two subsets of stationary and mobile units having the same properties as described for the set of root node quantum memory units, with the difference, that each first tier stationary quantum memory unit is assigned to one of several second tier locations.

The number of stationary quantum memory units for each first tier location is at least as great as the number of mobile quantum memory units sent to that location from the root node. In a further step, the entanglement of the mobile quantum memory units send to a first tier location is transferred to the stationary quantum memory units of that location, thereby connecting the stationary memory units of the root node and that first tier location. This is furthermore done for all first tier locations.

This procedure may be continued to include the second tier, a third tier, a fourth tier and so on to construct a tree-like hierarchy extending to a certain depth until on a lowest or user tier the quantum memory units belong to a user at a user node of the entanglement that is to be established. The set quantum memory units for each user may be characterized in that it contains only stationary and no mobile quantum units. Different users may be at different depths, i.e. the designation "lowest tier" or "user tier" should not be construed as implying that the quantum communications networks established with the described method are limited to (tree) structures, where all end users are at the same depth.

Compared to a scheme where the quantum memory units are transported directly from the root location to all users, this tree structure is more efficient, as each node only has to serve a limited number of lower tier nodes including user nodes.

In order to be able to hold an entangled link of given desired fidelity for the time it takes to physically move the memory units to their respective target locations and additionally a further waiting time until the entanglement is actually consumed, it will in general be necessary to employ actively error corrected quantum memory.

This is certainly true given today's level of technology where the memory times, i.e. the time after which error probability of a link has reached a certain threshold that depends on the application, of physical qubit implementations, such as ions in electromagnetic traps or defect centres in crystal lattices, are, e.g., on the order of a few tens of microseconds at 1% error probability even when they are cooled to cryogenic temperatures.

In embodiments of the invention it is therefore proposed that at least two of the quantum memory units comprise a logical qubit made up of a plurality of physical qubits, which employs active error correction in order to achieve a sufficiently long memory time.

In particular, in some embodiments the physical qubits are defect centres in a crystal lattice, such as NV centres in diamond or silicon carbide, or phosphorous in silicon with memory times at 1% error of between 10 and 100 microseconds and the quantum memory unit comprises at least one logical qubit comprising 300 or more, more preferably 1000 or more, most preferably 1300 or more such physical qubits. Together with active error correction techniques such as topological quantum error correction, such logical qubits would have effective memory times of between 5 seconds and 20 days or more, with memory times increasing exponentially as qubits are added. As an advantage over other qubit implementations, the density of qubit arrays possible in these materials make them conducive to a high qubit count, while the rigidity of the crystalline lattice provides portability.

A value of 20 days would already be sufficient to move the memory unit over intercontinental distances even by a comparatively slow mode of transport such as a ship. At lower numbers of physical qubits and thus lower effective memory times of the logical qubits, at least movement over shorter distances or by faster modes of transport such as trains or airplanes still allows a useful implementation of the method of the invention.

While, loosely speaking, a quantum memory unit may be identified with its logical qubits, it should be understood that in addition to the logical qubits the memory unit comprises the necessary hardware to interface the logical qubits with other logical qubits of the same memory unit or quantum hardware in or signals from the exterior.

Similarly, when speaking of a logical qubit, it should be understood that in the context of this disclosure, in addition to the physical qubits comprised in it, the logical qubit also includes the hardware necessary to interface and address the physical qubits in a way that they may be regarded as effectively only a single, effective, qubit including the single and two or multi-(physical)-qubit operations necessary to enable active error correction.

In some embodiments of the method of the invention, each quantum memory unit comprises only a single logical qubit. Alternatively, in other embodiments there is one or more memory unit comprising two or more actively error corrected logical qubits. As one logical qubit is capable of holding one link or sharing in one network, this allows one memory unit to hold several links or share in several networks simultaneously.

The desired network/graph state may be set up while the involved quantum memory units are all present at one location and are then transported to their respective desired target locations.

However, in an important alternative embodiments of the method of the invention, the quantum memory units that are to be joined into a network are not all provided at the same location, with at least one being disposed at a different location. In these embodiments, an initial nucleus of the network, i.e. at the minimum two quantum memory units joined by an entangled link, is created and then the network is grown by physically moving at least one of the quantum memory units of that nucleus to the location of another quantum memory unit. There, an entangled link is set up between the moved quantum memory unit and the other quantum memory unit and the other quantum memory unit thus joined to the network.

One or both of these two quantum memory units may then be moved to further locations to create links to further quantum memory units, further extending the size and complexity of the network.

In this way, a network of arbitrary complexity may be set up. In some embodiments, this network can correspond either to a predetermined, desired structure. Alternatively, the network is grown partially or completely 'at random', i.e. without prescribing a desired structure and movement of the memory units from location to location but rather establishing links as the opportunity arises when quantum memory units come sufficiently close on their courses which are otherwise directed.

This can, for instance, be implemented by associating each of the quantum memory units with a person who carries it around, much like other devices such as mobile phones or smartphones are carried nowadays. For quantum memory units too large to be carried by a person, transport in another vehicle, such as a car or a truck belonging to or used by that person is also possible. When two such persons carrying or transporting a quantum memory unit meet, they may establish a new entangled link between their memories, thus growing the network either by joining up two (up to that point) separate parts, or at least by increasing the number of links, creating a direct link where there had (up to then) only been an indirect link between the two quantum memory units.

In this context, the term different locations is to be interpreted as two or more locations on the surface of the earth or off it, that have a pairwise physical separation that is much larger than the size of the quantum memory unit itself, which apart from the physical substrate containing the qubits of the memory also comprises hardware for interfacing and controlling the qubits as well as hardware for controlling environmental parameters, such as the temperature or electric or magnetic fields the quantum hardware is subjected to, such that its dimensions will be on the order of between a few centimeters to a few meters. Accordingly the term 'same location' would mean points in physical space not separated by more than about a few times the physical dimension of a quantum memory unit, while "different locations" are those which are not the same.

In other important embodiments of the method according to the invention one or more further quantum memory units are provided at the second location and in a further step, through a short range entanglement operation, an entangled link is set up between at least one of the further quantum memory units and at least one of the quantum memory units, which have been physically transported from the first to the second location, thereby creating a quantum graph state shared by at least three quantum memory units located at the second location and at least one further location.

These embodiments of the method of the invention are thus characterized in that the network established not only by creating entanglement locally, between quantum memories close to each other, which are then physically transported to target locations, where the entanglement is then consumed at some later time. Rather, the network is in addition grown by interacting quantum memory units, that are already connected to the network with other quantum memory units, that are not, in order to connect the latter to the network as well.

The embodiments of this first aspect of the invention have in common, that instead of sending entangled photons over large distances, the entanglement of which needs to be transferred to a quantum memory upon reception, the quantum memory units are entangled while they are physically close, i.e. at the same location, e.g. within a few centimeters or meters of each other, and then physically moved to some other, different, locations, where either the entanglement is used/consumed, e.g. to generate secret key material or teleport quantum information, or the network is grown by establishing, again by local entanglement operations, more links to further quantum memory units, thereby connecting them to the network.

The comparatively long time taken to physically transport the quantum memories between remote locations, between minutes, hours, or even days or weeks, only affect the first establishment of a quantum connection. As long as subsequently a sufficiently large amount of quantum memories is sent continuously, high bandwidth quantum connections can be maintained. The issue of network latency, which would render the classical analog of this scheme impractical, does not affect quantum networks, as the entanglement is only a resource, which is consumed when needed.

Only classical signals have to be transferred quickly, for instance when desiring to teleport quantum information between two network locations. Therefore, as long as a low latency classical communications network is available, the latency of quantum communications achievable over the quantum network according to the invention is equally low and dependent on the latency of the classical communications network.

Another aspect of the invention concerns a quantum communicator device set out in claims 10 to 15 for use in some of the embodiments of the method according to the invention. The communicator device according to the invention comprises at least one quantum memory unit of a communications node, that quantum memory unit being able to hold an entangled link for a desired first memory time and being coupled to an optical interface to send and/or receive entangled photons to set up entanglement between the quantum memory and an external quantum memory, e.g. a quantum memory of a communications node of another quantum communicator device according to the invention. The communicator further comprises a quantum memory of a storage node capable of storing at least one qubit of quantum information for a given second memory time wherein the quantum memory unit of the storage node is coupled to the quantum memory unit of the communications node in the sense that multi qubit operations may be performed between them. The memory time is again defined as the time after which the probability that an error has occurred has reached a certain level, e.g. 0.1% or 1%.

To ensure a sufficient memory time of the quantum memories of both the storage and communications node, embodiments of the invention propose to employ actively error corrected quantum memory. In particular, at least one, preferably each, of the quantum memory units of the device according to the invention comprise a logical qubit comprising a plurality of physical qubits where active error correction techniques, such as for instance topological quantum error correction or other techniques known in the art, are employed to extend the memory time of the quantum memory from the memory time of the physical qubits to a longer effective memory time of the logical qubit.

In embodiments of the device, one, preferably each, of the logical qubits comprises 300 or more, in particular between 300 and 100, preferably 1000 or more, in particular between 1000 and 1300, more preferably 1300 or more, in particular between 1300 and 4200 and most preferably 4200 or more physical qubits.

With such numbers of physical qubits, effective memory times of the logical qubits of between 5 seconds, 31 hours or more and 20 days or more become possible. Therefore, in some embodiments of the device of the invention, the first memory time and/or the second memory time are 5 seconds or more, preferably 31 hours or more, most preferably 20 days or more.

A basic variant of the quantum communicator device contains only a single communications node and a single storage node, each comprising only a single logical qubits. In more capable variants of the device, more than one communications node and/or more than one storage node and/or more than one logical qubit per node are present.

In some embodiments, each storage node and/or each quantum memory unit of each storage node may be coupled to exactly one communications node and/or one quantum memory of one communications node. Alternatively, at least one storage node and/or quantum memory unit of one storage node is coupled to more than one communications nodes and/or more than one quantum memory units of the same or different communications nodes.

In particularly versatile embodiments, each storage node is coupled to all of the communications nodes in the sense that for each storage node it holds that for each communications node there is at least one quantum memory unit comprised in it which is coupled to a quantum memory unit of the storage node.

The quantum communicator device of the invention comprises an external interface and an internal interface. The external interface is an interface between the communications node and the storage node and corresponds to the hardware required to allow two- or multi-qubit operations between the (logical) qubits of the quantum memory units of the communications node and those of the storage node, in order to, e.g. create local entanglement between the qubits or transfer a quantum state from one qubit to another. In some embodiments, the internal interface allows multi-qubit operations between only some quantum memory units of the nodes, such as between exactly one quantum memory unit of the communications node for each quantum memory unit of the storage node.

In other embodiments, there are quantum memory units of the storage or communications node connected with more than one memory unit in the other node via the internal interface. In preferred embodiments, each storage node quantum memory unit is connected to each communications node memory unit.

The external interface allows the transfer of quantum information from the environment of the device to the quantum memory units of the communications node. For this purpose, the external interface comprises input (channels) corresponding to qubits, logical of physical, that are addressable from the outside, preferably optically, i.e. by photons of some wavelength lying in the optical, UV or infrared ranges. In particular the external interface comprises one input per quantum memory unit and/or per logical qubit of the communications node. Each input may be connected to one or more of the quantum memory units of the communications node.

In preferred embodiments, each input is connected to more than one quantum memory unit and or logical qubit of the communications node, in particular all quantum memory units and/or logical qubits of the communications node.

Further details and features of embodiments of the present disclosure are described below with reference to the figures of preferred exemplary embodiments. These are only intended to illustrate the various embodiments, and in no way to limit them.

DETAILED DESCRIPTION

Figure 1:
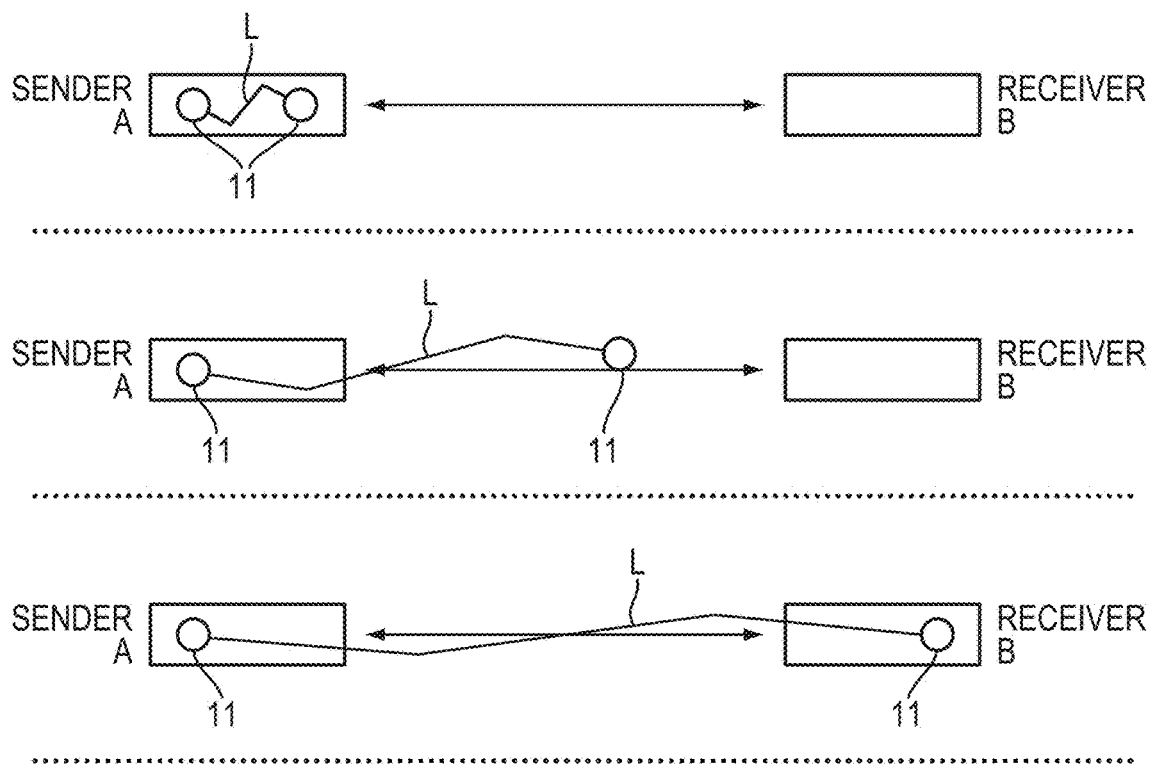
FIG. 1 is a schematic illustration of a first embodiment of the method according to the present invention, where entanglement between pairs of quantum memory units is established before one unit of the pair is physically moved to a target location

In the following, illustrative embodiments of the device and the method for establishing long range quantum communications networks according to this invention are presented.

In the figures, the same reference numerals are used also for different embodiments to denote features of corresponding function or meaning.

FIG. 1 illustrates schematically the central steps of a first embodiment of the method according to the prior art. In a first step, an entangled link L between a pair of quantum memory units 11 located at a sender position A is established before, in subsequent steps one quantum memory unit 11 of the entangled pair is physically moved to a remote target location B of a receiver, thus establishing an entangled link between sender and receiver.

In this context, remote is to be interpreted as a distance or separation in physical space between the locations, here of sender and receiver, that is much greater than the physical dimensions of the memory units. While in the context of the invention the quantum memory units are held to have characteristic dimension of between a few millimeters to a few meters, the distance between locations would be a few tens of meters or more, in particular between a few kilometers to a few megameters or more.

The Link L may be a Bell-state, i.e. a joint quantum state of two qubits of the quantum memory units 11 that can be described by $|00\rangle+|11\rangle$ where $|0\rangle$, $|1\rangle$ are the basis states of the individual qubits in some computational basis. It may also be any other joint quantum state with non-zero entanglement.

Even if fast known modes of transport, such as airplanes or rockets, are used, the physical movement of quantum memory units as proposed by the invention is much slower than the state of the art of sending entangled photons from A to B to establish entanglement, either via optical fibres or in a free-space via satellites, which allows setting up links at the speed of light assuming that the infrastructure necessary in each case, i.e. satellite(s) or fibre optics cable(s) with quantum repeater stations, are in place. However, the data rate achievable is limited only by the size of the quantum memory units or, equivalently, by the qubit density of the quantum memory units.

If, for instance, a transpacific quantum communications link is set up by moving quantum memory units by ship from Los Angeles to Tokyo with an assumed transit time of 20 days and physical separation of 1 micron between physical qubits, which would allow to store 22.6 TQbit in 1 m$^3$ of space, a bandwidth of 13 MHz could be achieved. Each factor of 10 improvement in the physical separation yields a three orders of magnitude improvement in bandwidth, s.t. at only 100 nm physical qubit separation the bandwidth would be 13 GHz. For a ship with a 15,000 m$^3$ capacity, this comes to 200,000 THz, which is hundreds of times greater than the classical data capacity of the optical links between those two cities today and probably sufficient to match the capacity of future classical data channels between them. This compares very favorably with state of the art methods of sending photons, which allows quantum communication neither at these data rates nor over such distances. Moreover, the method of the invention does not require any costly communication infrastructure like fibre optical cables or satellites to be set up. Thus, only a single cargo-ship equipped with commodity quantum memory units can provide secure quantum connections between major cities, thereby effectively upgrading any existing classical cable-links to quantum security.

Figure 2A:
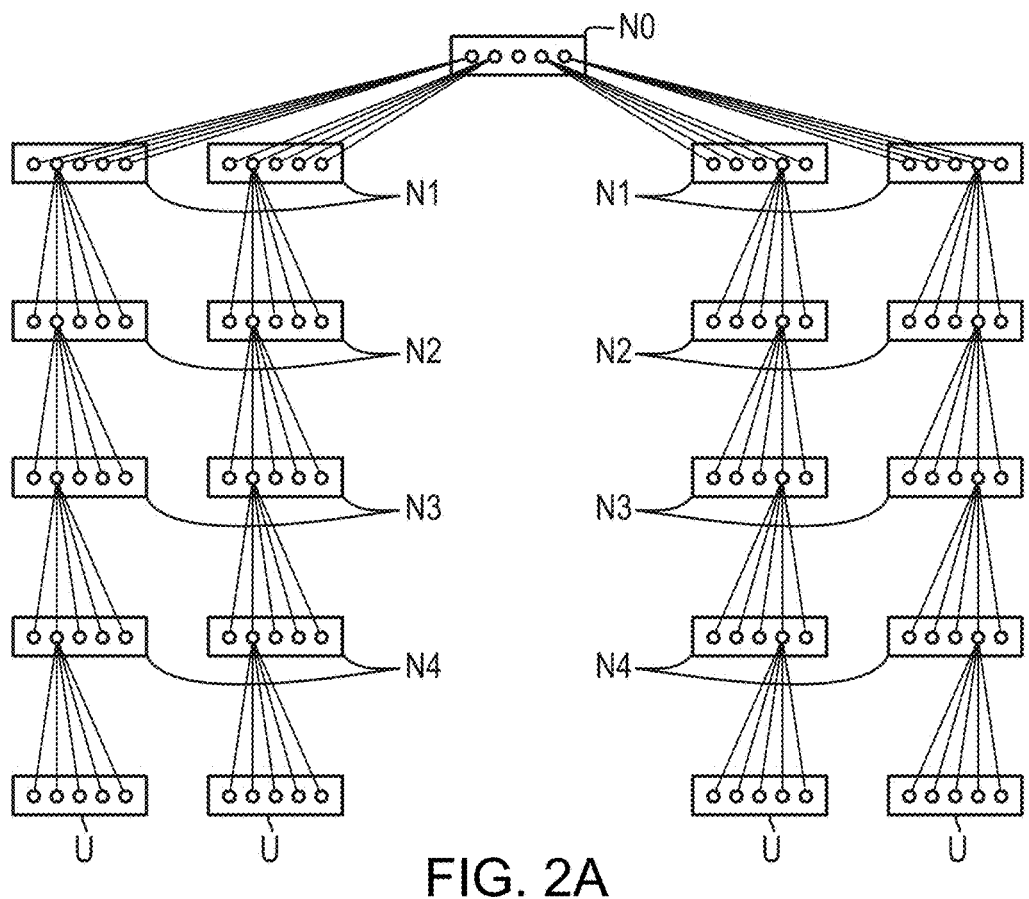
FIG. 2A is a schematic illustration of a hierarchical network of quantum communications links between multiple locations set up in accordance with the first embodiment.

In FIG. 2A there is shown a schematic illustration of a hierarchical network of quantum communications links between multiple locations set up in accordance with a first embodiment of the present invention.

The network as illustrated in FIG. 2A is created in several steps.

In a first step, quantum memory units are created and entangled at a root node N0 and then distributed by transporting a subset of them, denoted mobile (quantum) memory units, physically to first tier nodes N1, which are remote from the root node N0, while another subset, denoted fixed quantum memories to distinguish them from the mobile memories that are transported, remains at N0. In a second step, each first tier node N1, itself having a set of quantum memory units that can be classified into fixed and mobile units, uses the entangled quantum memory unit(s) it receives from the root node N0 to create entangled links between its set of fixed memory units and the root node N0.

Herein, the links may be one-to-one, such that each quantum memory unit of the root node N0 is linked to exactly one quantum memory of one of the first tier nodes N1. However, the links may also be one-to-many, such that, as is shown in FIG. 2A, one or more of the quantum memory units of the root node N0 are connected to two or more quantum memories belonging to a first tier node N1.

In a third and a subsequent fourth step, that do not necessarily have to chronologically follow the first and second step, but can take place before, after or simultaneously, each first tier node N1 generates one-to-one or one-to-many entanglement between its fixed and mobile quantum memories, similar to the root node N0, and distributes it to associated second tier nodes N2, where each second tier node N2 is associated with one of the first tier nodes N1. Like the first tier nodes N1 in the second step, the second tier nodes use the mobile memories sent by the associated first tier nodes N1 to create entangled links between its fixed quantum memories and (a part of) the fixed quantum memory units of the associated first tier nodes N1.

This scheme is continued in further pairs of steps corresponding to each tier below the second, creating a tree-structure of entangled links. In FIG. 2A four tiers of nodes are shown between the root node N0 and a lowest tier, where each node U corresponds to a user who wishes to consume the entangled links created to achieve some quantum communications task such as teleporting a quantum state to some other user or establishing shared secret key material.

While it is theoretically imaginable to transport the entangled quantum memory units directly from the root node N0 to the end users U, thus skipping over the intermediate tiers shown in FIG. 2A, this is not very practical, since the number of transport paths would be too great and the coordination of the delivery consequently too complex.

In contrast, the tree-like distribution scheme illustrated in FIG. 2A is much more economical and efficient.

Figure 2B:
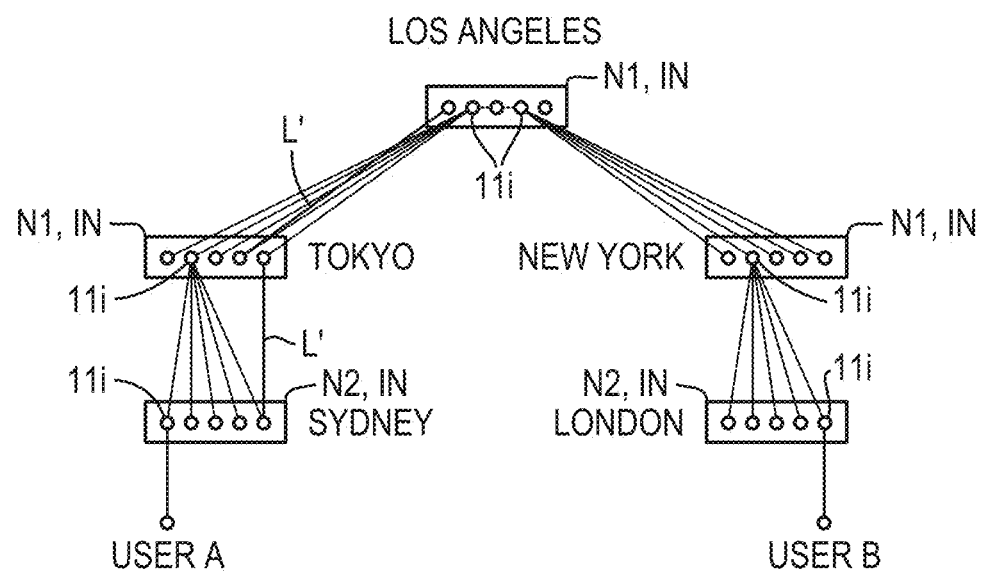
FIG. 2B is a schematic illustration of the creation of a direct link between two users on the lowest-tier of the hierarchy shown in FIG. 2A.
Figure 2B:
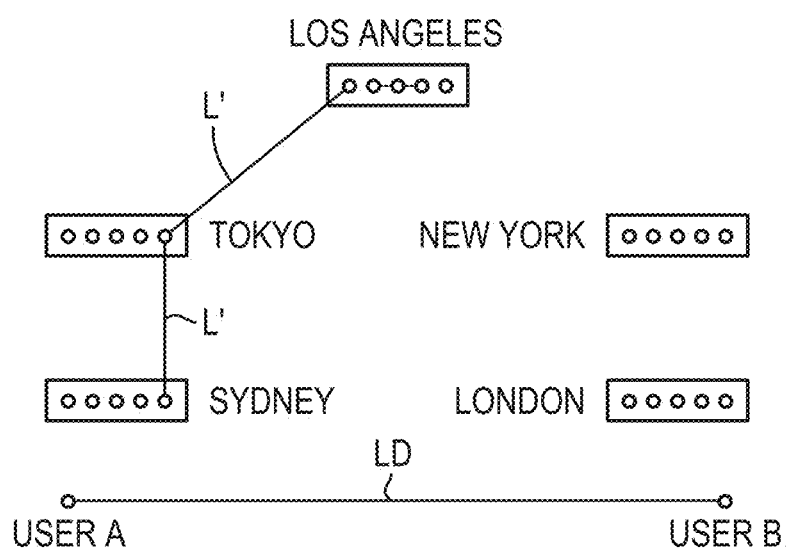

FIG. 2B depicts in the form of a schematic illustration the creation of a direct link between two users participating in the network of FIG. 2A. User A and B are both situated on the lowest-tier of the hierarchy shown in FIG. 2A. Users A and B are linked indirectly going through each of the intermediate nodes IM, corresponding to the higher nodes N2, N1 and N0, where for instance, as shown in the Figures, the second tier nodes might be located in Sydney and London and the first tier nodes N1 in Tokyo and New York, with the root node assumed to be in Los Angeles. When Users A and B notify the classical co-ordination system of the network, which keeps track of all the established links and the network structure, that they wish to establish a direct entangled link, the network instructs the intermediate nodes IM between A and B to perform a quantum measurement of (all) their quantum memory units $11i$, marked in the upper part of FIG. 2B, sharing in the indirect link between A and B, thus eliminating them from the joint quantum state. This leaves only the quantum memories of users A and B entangled, thereby establishing the direct link LD between them, as is illustrated in the lower part of FIG. 2B.

As also illustrated, other links held in the same quantum memory units $11i$, or rather the same qubits, will disappear in this process.

However, the Links L', which are stored in separate quantum memories, or at least separate qubits of the same quantum memory $11i$, of the nodes N0, N1 and N2, are not affected by the measurement process and survive.

Figure 3:
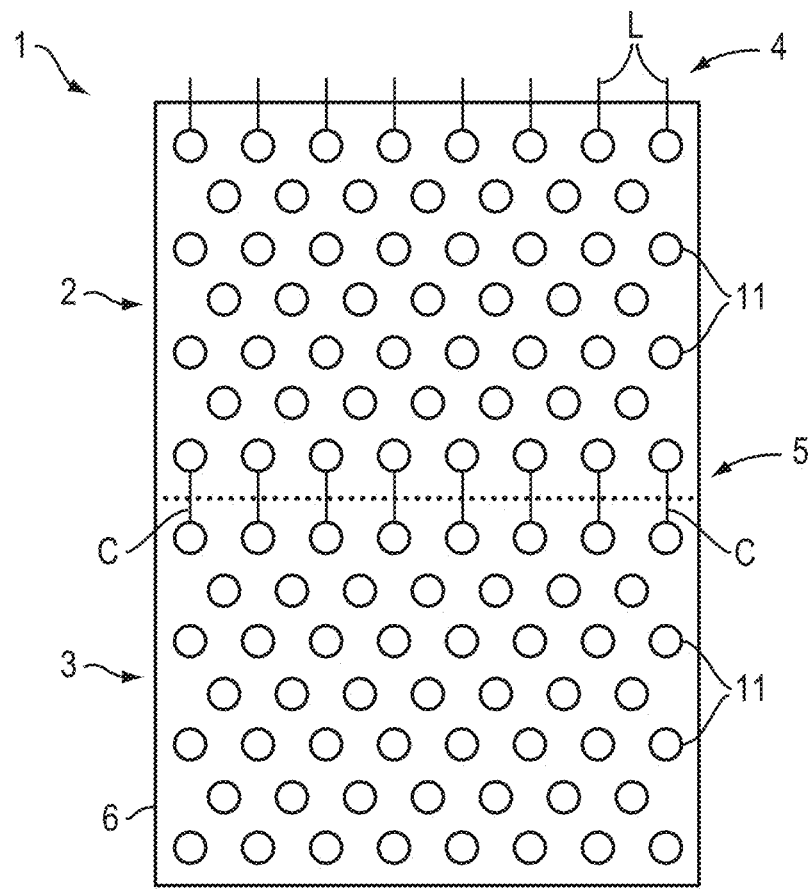
FIG. 3 is a schematic of a quantum communicator device for use in the second embodiment of the inventive method illustrated in FIGS. 4A-C.

FIG. 3 shows a schematic of a quantum communicator device for use in the second embodiment of the method according to the invention illustrated in FIGS. 4A-4C described further below.

In the embodiment shown in FIG. 3, the quantum communicator device 1 comprises a communications node 2, a storage node 3, an external interface 4 for enabling interaction between the communications node and the environment, an internal interface 5 for coupling the storage node 3 and the communications node 2 and a housing 6 providing a physical support and protection to the other components.

The communications node 2 and the storage node 3 comprise an array of quantum memory units 11, symbolized by the empty circles of which, to avoid cluttering the figure, only some are explicitly labelled.

Each quantum memory unit 11 in turn comprises one or more logical qubits made up of a plurality of physical qubits (not shown). By help of active error correction, any quantum information stored in the logical qubits of the memory units, whether it is a product state, an entangled joint quantum state of local qubits of the device 1 or entanglement with one or more remote qubits or a combination of all three types, will be maintained for a sufficient memory time at a given, desired error probability to be able to grow a quantum communications network consisting of a joint quantum state between two or more remote quantum communicator devices according to the principles of the method of the invention and subsequently perform useful quantum communications and information tasks. In particular the logical qubits of the quantum memory units 11 each comprise 300 or more, preferably 1000 or more, most preferably 1300 or more physical qubits, yielding memory times at an allowed error rate of 1% of between 5 s or more, preferably 31 hours or more, most preferably 28 days or more.

The external interface 4 is an optical interface for sending and receiving photons in the IR, optical or UV wavelength ranges. Each of the quantum memory units 11 of the communications node 2 may be addressed via the external interface 4, i.e. each quantum memory unit 11 is accessible via at least one input line or channel L. That only the uppermost row of quantum memory units 11 is depicted as connecting to or being addressable via an input L is only for the sake of illustrative simplicity and to avoid cluttering the Figure.

When acting as a sender, pairs of entangled photons may be generated, where then one photon is then absorbed and its entanglement transferred to one of the memory units 11 of the communications node. Alternatively, a source of single photons entangled with that source may be provided and the entanglement transferred from the source to one of the memory units by help of two qubit operations.

In either case, the external interface 4 allows creation of entangled links L between the quantum memory units 11 of the communications node 2 and the environment. When acting as a receiver, the interface does not actively create entangled photons, but listens for and absorbs incoming photons. Upon absorption of a photon, the multi-qubit-operations necessary to transfer an entangled link to a logical qubit of one of the memory units 11 of the communications node 2 are performed. Therefore, if the absorbed photon had been carrying entanglement, this entanglement is transferred to the communications node.

The internal interface 5 serves the purpose of coupling the memory units 11 of the storage node 3 to those of the communications node 2. To this end, the internal interface 5 allows two or multi qubit interactions between the memory units 11 of both the communications node 2 and storage node 3. These possible interactions, which may be used to set up entanglement or swap or copy quantum states, are symbolized in FIG. 3 by the links C crossing the dotted line marking the separation between communications node 2 and storage node 3. In FIG. 3, the couplings C only connect the uppermost row of quantum memory units 11 of the storage node and the lowermost row of quantum memory units 11 of the communications node 2. However, it should be understood that this is only for the sake of illustrative simplicity, and that in fact in the present embodiment each quantum memory unit 11, and each logical qubit therein, of the storage node 3 is coupled to at least one quantum memory unit 11 of the communications node 2.

To avoid cluttering the Figure, only part of the quantum memory units 11, couplings C and external input lines L are labelled. It should be understood that equal symbols correspond to structures of equal or corresponding function.

The components of the device are protected by a housing 6, which also provides a physical structure, to which they are attached.

Figure 4A:
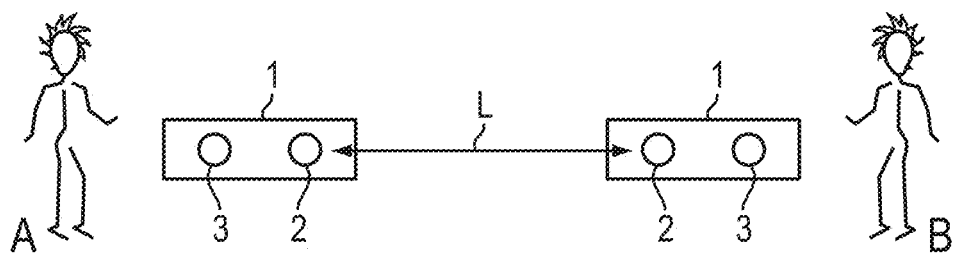
FIG. 4A is a schematic illustration of a second embodiment of the method according to the present invention, where entanglement is created between two communications nodes of two quantum communicator devices as depicted in FIG. 2B, each held by a user, that are physically close to each other.

In FIG. 4A, a schematic illustration of one step of a second embodiment of the method according to the invention is shown. In this step, entanglement is created between two communications nodes of two quantum communicator devices as depicted in FIG. 3, each held by a user, when they are physically close to each other.

Users A and B both hold a communicator device 1 as described with reference to the previous FIG. 3. When they come within a maximum range for establishing an entangled link, one of user A or user B acts as a sender, creating and sending one or more entangled photons to the device 1 of the other user, where it is absorbed and its entanglement transferred to (a quantum memory unit) of the storage node 2.

Herein the maximum range depends on the details of the optical interface of their communicator devices 1 and will usually lie between a few centimeters and a few meters.

Taking with them their respective device 1, the users may then go separate ways, increasing their distance beyond the maximum range to an arbitrary value, while the entanglement they have created between their devices is maintained to within the desired allowed error, for at least the memory time of the quantum memory units of the communications nodes 2 of their respective devices 1.

At a later time, they may consume the entanglement to perform a desired quantum communications task, such as teleporting quantum information stored in their storage node to the other user or, by performing quantum measurements of the qubits holding the entangled links, create a shared secret key. In order to allow creating a key of sufficient length, say 128 bits or more, preferably 256 or more, a corresponding number of entangled links should be established in the first step described above. In order to store this number of links, all quantum memory units of the communications node 2 of the quantum communicator device 1 taken together should therefore have at least 128 qubits, in particular between 128 and 256 qubits, preferably 256 qubits or more, in particular between 256 and 1024 qubits.

Figure 4B:
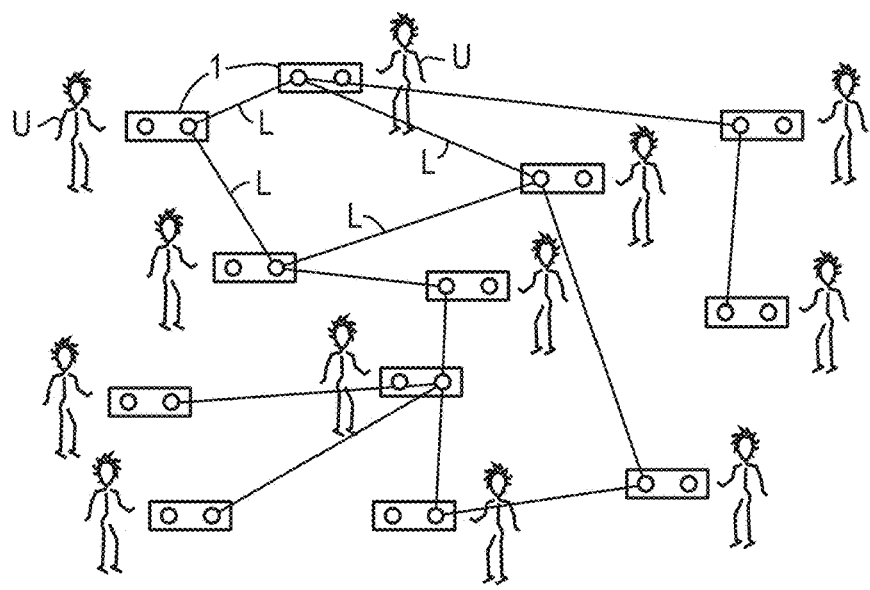
FIG. 4B is a schematic illustration of an example network of entangled links set up gradually between multiple quantum communicator devices by repeatedly employing the process depicted in FIG. 4A followed by the devices being physically moved into the vicinity of other devices.

FIG. 4B is a schematic illustration of an example network of entangled links set up gradually between multiple quantum communicator devices by repeatedly employing the process depicted in FIG. 4A followed by the devices being physically moved into the vicinity, i.e. within the maximum range, of other devices.

As described with reference to FIG. 4A, the quantum communicator devices 1 according to the invention may be used to enable setting up private and secure quantum communications between two users A and B. However, the quantum communicator devices furthermore allow setting up an entire network of entangled links between multiple users, such as the exemplary one illustrated in FIG. 4B. Each of the users U has one quantum communicator device 1, the communications node of which holds entangled links L to the nodes of other devices. This network is set up gradually by pairwise interaction of users as described with reference to FIG. 4A, as and when they come within the maximum range of the devices, either by chance or already with the intention of establishing a new link.

As in FIG. 3, not all users, devices and links are explicitly labelled. It should be clear to the skilled person that like symbols denote like structures or functions.

Figure 4C:
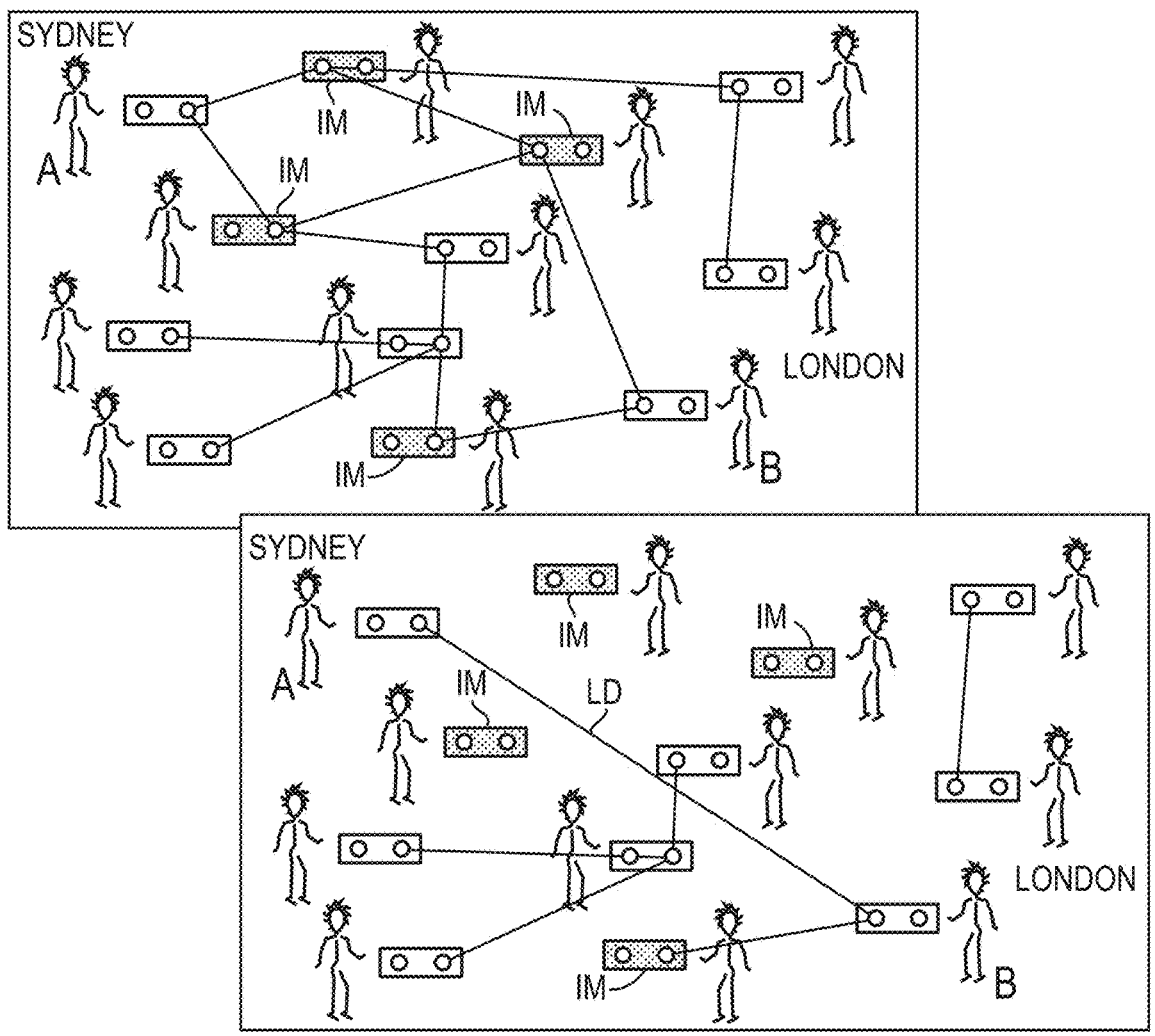
FIG. 4C is a schematic illustration of the creation of a direct link between two quantum communications devices of two users that are indirectly connected through the network depicted in FIG. 4B.

FIG. 4C illustrates schematically how a direct link between two quantum communications devices of two users that are indirectly connected through the network depicted in FIG. 4B is established.

In the quantum communications networks of entangled links described with respect to the previous FIG. 4B, not all users will share a private direct link. Either the direct link they may share is not private in the sense that it is not a two-party but a multi-party quantum state, such that there are quantum correlations with other parties that make the teleportation of a quantum state or extraction of a shared secret key impossible, or there is no direct link, i.e. they are linked only through a number of intermediate users IM, as is the case for the users A, assumed to be located in Sydney, and B, assumed to be based at London, in the upper left subfigure of FIG. 4C. However, if A and B want to establish an exclusive direct link between each other, according to this embodiment of the method according to the invention, they make a request to that effect via the classical network co-ordination system, which keeps track of all the links in the network. The classical co-ordination system may be a decentralized system running on the classical computational support hardware running the quantum hardware of the communicator devices of the users. The classical network coordination system will then instruct the communicator devices of all intermediate users IM, in the figure also marked by the filled communicator device symbols, to perform a quantum measurement of the logical qubits involved in the indirect link. This then leads to the state depicted in the lower right subfigure of FIG. 4C, where a private direct link LD has been established between (the communicator devices of) users A and B.

Assuming, as is done in the Figure, that the intermediate users did not maintain multiple links to each other, or that they had to all be measured out, they will be disconnected from the network until they are able to reconnect by meeting up with a connected user and performing the procedure described above with reference to FIG. 4A. Due to its small size, the simple example network of FIGS. 4B and 4C is easily split into several connected components as some users get disconnected. In the example shown in FIG. 4C, disconnecting the four intermediates IM leads to the network splitting into three connected components (counting users A and B sharing the link LD as one component). However, larger networks with a denser and more robust link structure are not split so easily anymore, in particular if at each meeting and link-up event between users, a multitude of links, such as 128 or more, in particular between 128 and 256, preferably 256 or more, in particular between 256 and 1024, most preferably 1024 or more separate entangled links are established, in order to have a sufficient buffer against requests such as the one made by users A and B in the above example.

The two embodiments of the quantum networking method of this invention illustrated and described above with reference to FIGS. 2A-2B and FIGS. 4A-4C may also be combined in that a user of a quantum communicator device according to the invention and sharing in a network created by planned or unplanned user interactions as according to the embodiment of FIGS. 4A-4C may connect up to a tree-like hierarchical network of the embodiment of FIGS. 2A and 2B.

This can be done either by the user being among one of the users of the hierarchical network in the first place and receiving a mobile quantum memory from an intermediate node, i.e. one of the fourth tier nodes of FIG. 2A. Alternatively, the user carrying his/her quantum communicator device according to the invention may come into the vicinity of another user already participating in the hierarchical network or into the vicinity of one of the intermediate nodes.

In either case, the two networks would be connected by setting up a short range entangling link between the user and the other user or node by help of the optical interface of the user's communicator device.

FIGS. 5A-5D illustrate a preferred physical implementation of the qubits used in the quantum memory units employed in the method and device disclosed above. The physical qubits making up the logical qubits of the quantum memory units are preferably realized as Nitrogen Vacancy (NV) centres in diamond or silicon carbide. An NV centre is a lattice vacancy adjacent to a substitutional nitrogen. In diamond, this description alone uniquely determines an NV, while in silicon carbide, having a lattice structure similar to diamond however without the inversion symmetry, one further needs to specify whether the nitrogen substitutes for a silicon or a carbon atom.

In both cases, the orbital degrees of freedom of the valance electrons of the atoms surrounding the vacancy combine into an effective spin S=1 defect, which is hyperfine coupled to the nuclear spin of the nitrogen atom, which may be a spin I=1 14N with or a I=½ 15N. The quantum state of these coupled spins may be manipulated by RF signals and read out using optical excitation Arrays of equally spaced NV centres may be created in a controlled and targeted fashion in diamond or silicon carbide chips by ion implantation followed by an annealing step, as is disclosed in U.S. Provisional Patent Application No. 62/959,670.

Figure 5A:
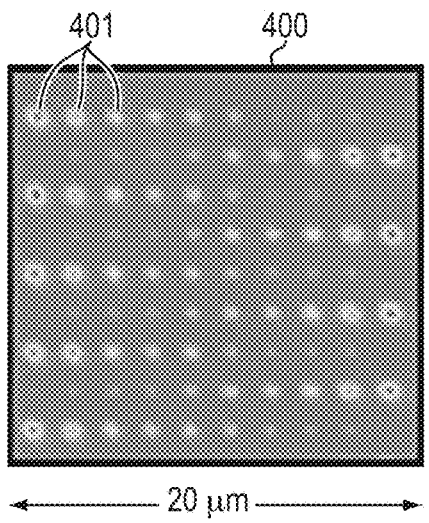
FIGS. 5A to 5D depict an illustration of a preferred implementation of the physical qubits of the quantum memory units of the invention as NV centres in silicon carbide.

FIG. 5A shows a 20 Micrometer wide cutout of a diamond chip 400 resulting from such an implantation process. As can be seen, a regular square array of defects (e.g. 401) has been created with an array pitch or lattice constant of about 2 Micrometers between neighbouring NV centres. Instead of diamond, silicon carbide may be used. The type of NV centre created, i.e. whether a carbon or a silicon atom has been substituted in the implantation, can be determined in the characterization measurement process, which is necessary also in the case of diamond to make certain of the control parameters of each NV centre.

Figure 5B:
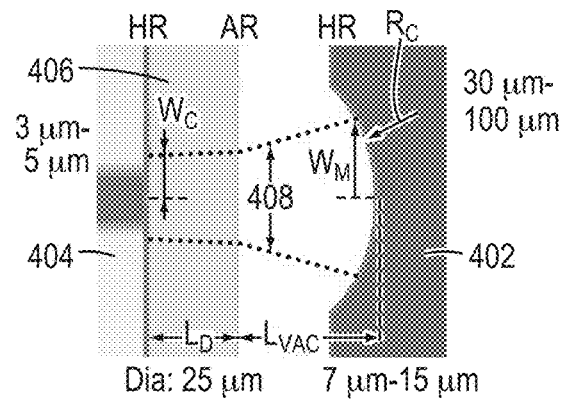

To address and read out the NV defect qubits, it is proposed to place them in micro-cavities connected to optical fibres such as the one illustrated in FIG. 5B. A silicon substrate 402 is curved and polished to produce an ultra-high reflectivity mirror. This curved mirror is parameterised by its radius of curvature, R, and depth beneath the surface of the silicon. The optic fiber 404, coated with a dielectric coating 406 that on one side is polished to be highly reflective (HR) and anti-reflective (AR) on the other. The thickness of this dielectric coating is approximately LD=25 micrometers.

The bottom of the silicon mirror is between 7 and 15 micrometers from the AR side of the dielectric coating. The length of the cavity LD+LVAC=L determines the exact resonance frequency of the cavity. The optical field mode created from this cavity system can be characterized by the side of the field at the fiber side wC and the mirror side wM, where a pulse 408 emanating from the optic fiber broadens due to dispersion and then is reflected back to the fiber by the mirror. The two HR coatings ensure the setup of a standing wave pattern between the mirrors and, with high-quality mirrors, enhance the interaction between the NV-defect if placed at an antinode of the electromagnetic field within the cavity.

Figure 5C:
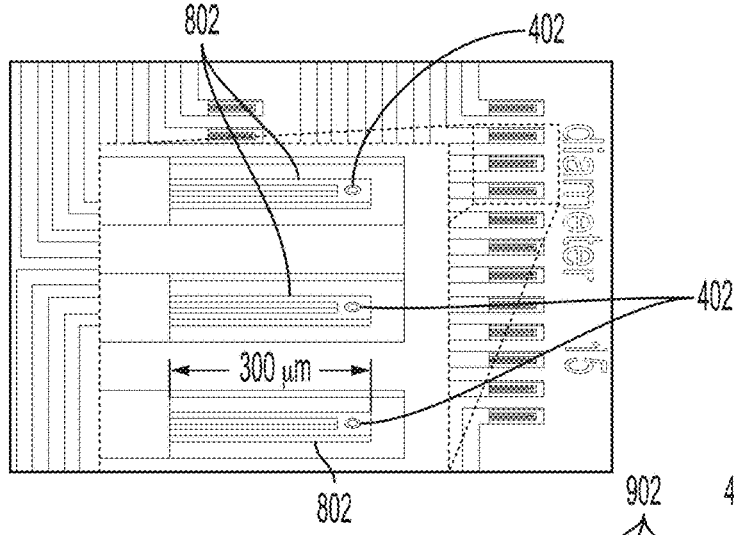

The invention proposes further to create an array of mirrors placed at the end of cantilevers etched out of a silicon substrate such as illustrated in FIG. 5C. In the Figure, nine arms 802 with their corresponding electrodes are shown in an overview. The inset shows an enlarged view of the upper three cantilevers 802 with the mirrors 402 visible near their tips. The length of 300 Micrometers per arm 802 given in the figure is only exemplary. Other lengths might be chosen according to the circumstances.

Figure 5D:
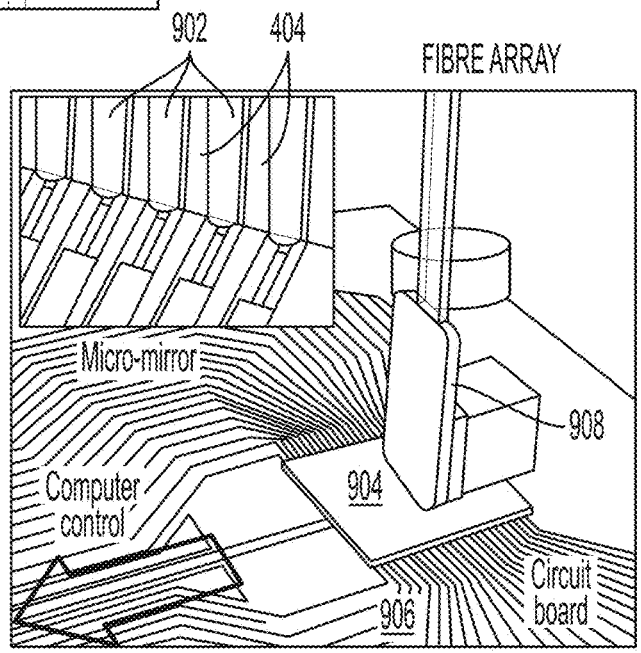

FIG. 5D shows a complete setup of the qubit implementation complete with the integrated optical interface for addressing the NV centres. The inset diagram of the figure shows the mounting and alignment scheme for an array of fibre optic cables. The structure is an etched silicon chip containing V-shaped grooves (e.g., 902, dark gray) that are aligned with each micro-mirror cavity fabricated on each cantilever in the silicon chip. The v-shaped grooves are used to align each optic fibre (e.g., 404, light gray) with the cantilever mirrors and ensure that the optical mode for each single-mode fibre couples directly to the cavity at each location of the chip. This device is then mounted on top of the silicon micro-mirror cantilever array as illustrated in the main part of FIG. 5D. The actual silicon micro-mirror chip is the object 904 in the centre of the image, with each conduction track for cantilever control and calibration coming off onto an external circuit board 906.

The silicon fibre optic mounting chip 908 sits vertically on top of the micro-mirror chip and optic fibers come out vertically from the mounting chip to various lasers and spectral analyzers.

Although the embodiments of the present disclosure have been described with reference to preferred embodiments, those skilled in the art will recognize that changes may be made in form and detail without departing from the spirit and scope of the present disclosure.

LIST OF REFERENCE CHARACTERS

A, B, U, IM users
11, 11i quantum memory unit
C coupling
L, L', LD entangled links
N0 root node
N1 first tier nodes
N2 second tier nodes
N3 third tier nodes
N4 fourth tier nodes
1 Quantum communicator device
2 communications node
3 storage node
4 external interface
5 internal interface
6 housing and support structure
400 NV array chip
401 NV centre
402 micro-mirror
404 optical fibre
406 dielectric layer
408 broadening pulse
802 cantilever
902 v-shaped grooves
904 micro-mirror chip
906 circuit board
908 fibre optic mounting chip

What is claimed is:

1. A method for setting up a quantum communications network of entangled links between a plurality of locations that are remote from each other, comprising
   a. providing two or more quantum memory units disposed at a first location of the plurality of locations,
   b. setting up an entangled link between at least two of the quantum memory units,
   c. physically transporting at least one of the quantum memory units sharing in an entangled link to a second location of the plurality of locations,
   wherein a joint quantum state, corresponding to a graph state with more than two nodes, is set up between quantum memories located at three or more locations that are remote from each other.

2. The method of claim 1, wherein more than two quantum memory units are provided at the first location.

3. The method of claim 1, wherein at least one of the quantum memory units comprises one or more actively error corrected logical qubits.

4. The method of claim 3, wherein the one or more actively error corrected logical qubits comprise a plurality of physical qubits.

5. The method of claim 4, wherein the plurality of physical qubits comprises 300 or more physical qubits, 1000 or more physical qubits, or 1300 or more physical qubits.

6. The method of claim 1, wherein the quantum memory units at the first location form a set comprising a subset of stationary quantum memory units and a subset of mobile quantum memory units, and wherein each mobile quantum memory is associated with one of the stationary quantum memory units, and a joint quantum state corresponding to a graph state with two or more nodes is set-up between each stationary qubit and its associated mobile quantum memory units.

7. The method of claim 6, wherein there is one root node location, the first location being that root node location, and a number of first tier node locations, the second location being one of these first tier node locations, and wherein a number of stationary quantum memory units equals the number of first tier node locations, and each one of the stationary quantum memory units being assigned to exactly one of the first tier locations, and for each stationary quantum memory unit the associated mobile quantum memory units are physically moved from the root node location to its assigned first tier node location.

8. The method of claim 1, wherein at least one further quantum memory unit is provided at the second location and in a further step d. through a short range direct entanglement operation an entangled link is set up between at least one of the further quantum memory units and at least one of the quantum memory units, which have been physically transported from the first to the second location, thereby creating a quantum graph state shared by at least three quantum memory units located at the second location and at least one further location of the plurality of locations.

9. The method of claim 1, wherein a classical, i.e. non-quantum, coordination system keeping track of all entangled links in the network, in particular a distributed coordination system without central control.

10. The method of claim 1, wherein a distance between any two of the plurality of locations is at least a hundred meters.

* * * * *